US009569688B2

(12) United States Patent
Lee (10) Patent No.: US 9,569,688 B2
(45) Date of Patent: Feb. 14, 2017

(54) APPARATUS AND METHOD OF DETECTING MOTION MASK (71) Applicant: Hanwha Techwin Co., Ltd., Changwon-si (KR)

(72) Inventor: Hyunggeun Lee, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 45 days.

(21) Appl. No.: 14/745,591

(22) Filed: Jun. 22, 2015

(65) Prior Publication Data
US 2016/0125616 A1   May 5, 2016

(30) Foreign Application Priority Data

Oct. 30, 2014 (KR) .................. 10-2014-0149325

(51) Int. Cl.
  *G06K 9/56* (2006.01)
  *G06K 9/46* (2006.01)
  *G06T 7/20* (2006.01)
(52) U.S. Cl.
  CPC ........... *G06K 9/4638* (2013.01); *G06T 7/2006* (2013.01); *G06T 7/2053* (2013.01); *G06T 2207/20208* (2013.01); *G06T 2207/30232* (2013.01)
(58) Field of Classification Search
  CPC ... G06K 9/4638; G06T 7/2006; G06T 7/2053; G06T 2207/20208
  USPC ....... 382/170, 171, 190, 205, 278, 282, 283; 358/517, 537, 538, 452, 453
  See application file for complete search history.

(56) References Cited

U.S. PATENT DOCUMENTS

| 7,103,211 B1* | 9/2006 | Medioni ................ G06T 17/10 382/118 |
| 7,260,814 B2* | 8/2007 | Rodin ..................... G03F 1/144 716/52 |
| 7,408,631 B2* | 8/2008 | Arnz .................... G03F 7/70941 355/53 |
| 7,755,748 B2* | 7/2010 | Arnz .................... G03F 7/70591 356/124 |
| 8,150,194 B2* | 4/2012 | Fujibayashi ......... G06T 7/2013 382/107 |
| 8,208,030 B2 | 6/2012 | Siddiqui et al. |

(Continued)

FOREIGN PATENT DOCUMENTS

| JP | 2008-028500 A | 2/2008 |
| JP | 2009-088884 A | 4/2009 |
| KR | 10-2013-0031574 A | 3/2013 |

*Primary Examiner* — Yosef Kassa
(74) *Attorney, Agent, or Firm* — Sughrue Mion, PLLC (57) ABSTRACT An apparatus for detecting a motion mask includes: an image processor configured to generate a plurality of image frames; a first motion mask detector configured to detect at least one first motion mask by calculating a local feature of each pixel included in a partial or entire area of at least one current image frame which indicates a pixel value relationship between the each pixel and at least one neighboring pixel, and comparing the calculated local feature with a local feature of a corresponding pixel of at least one previous image frame; a second motion mask detector configured to detect at least one second motion mask based on a difference between the partial or entire area of the current image frame and a corresponding area of the previous image frame; and a motion mask generator configured to generate a final motion mask comprising at least one of the first motion mask and the second motion mask.

20 Claims, 7 Drawing Sheets (56) References Cited

U.S. PATENT DOCUMENTS

| | | |
|---|---|---|
| 8,571,261 B2 | 10/2013 | Gagvani et al. |
| 8,588,517 B2 | 11/2013 | Lee et al. |
| 8,675,736 B2 * | 3/2014 | Huang ................. H04N 19/139 |
| | | 348/699 |
| 2013/0070965 A1 | 3/2013 | Jang et al. |

* cited by examiner

FIG. 8C

APPARATUS AND METHOD OF DETECTING MOTION MASK

CROSS-REFERENCE TO THE RELATED APPLICATION

This application claims priority from Korean Patent Application No. 10-2014-0149325, filed on Oct. 30, 2014, in the Korean Intellectual Property Office, the disclosure of which is incorporated herein in its entirety by reference.

BACKGROUND

1. Field

Apparatuses and methods consistent with exemplary embodiments relate to of detecting a motion mask.

2. Description of the Related Art

A general image processing apparatus has a limited luminance range for capturing/expressing an image, compared to a luminance range of a human being that perceives a natural image with the naked eyes. Thus, an image captured or reproduced by using a digital image processing apparatus may have luminances and colors of pixels only within a limited range. In particular, when an image is captured in an environment having both a bright area and a dark area, for example, when a backlight is used to capture an image or when a bright light source exists in a dark room, information, gradation, and color reproduction of an object are degraded in the image. A digital image processing technique used to address this problem is wide dynamic range imaging.

A high dynamic range (HDR) image is obtained by applying weights to a plurality of low dynamic range (LDR) images and merging the weighted images. However, while the LDR images are obtained, an image overlap may occur when a target object moves or a background changes. Thus, it is necessary to detect and compensate for this image overlap of the object or the change in the background in the LDR images.

Examples of a related art method of avoiding an image overlap during HDR imaging include distribution-based motion detection, entropy-based motion detection, and histogram-based motion detection.

SUMMARY

Exemplary embodiments of the inventive concept provide an apparatus and method of detecting a motion mask.

Various aspects of the embodiments will be set forth in part in the description which follows and, in part, will be apparent from the description, or may be learned by practice of the embodiments.

According to one or more exemplary embodiments, there is provided an apparatus for detecting a motion mask which may include: an image processor configured to generate a plurality of image frames; a first motion mask detector configured to detect at least one first motion mask by calculating a local feature of each pixel included in a partial or entire area of at least one current image frame which indicates a pixel value relationship between the each pixel and at least one neighboring pixel, and comparing the calculated local feature with a local feature of a corresponding pixel of at least one previous image frame; a second motion mask detector configured to detect at least one second motion mask based on a difference between the partial or entire area of the current image frame and a corresponding area of the previous image frame; and a motion mask generator configured to generate a final motion mask including at least one of the first motion mask and the second motion mask.

The first motion mask detector may be further configured to exclude from the first motion mask a pixel by determining whether a difference between a maximum pixel value and a minimum pixel value from among pixel values of neighboring pixels of the pixel exceeds a preset critical value.

A local feature of a pixel in the current image frame may indicate a pixel value relationship between two pixels among the pixel and neighboring pixels of the pixel, and thus, the first motion mask detector may be further configured to detect a pixel as the first motion mask by determining whether a number of local features of the pixel, which are the same as local features of a corresponding pixel in the previous frame, is equal to or less than a preset critical value.

The second motion mask detector may be further configured to detect a pixel as the second motion mask by determining a difference between the pixel in the current image frame and a corresponding pixel in the previous image frame is equal to or greater than a preset critical value.

The motion mask generator may be configured to generate, as the final motion mask, a common area in the current image frame between the first motion mask and the second motion mask or an area including both the first motion mask and the second motion mask.

The at least one current image frame may include a plurality of current image frames captured by using different exposures, the at least one first motion mask may include a plurality of first motion masks, and the at least one second motion mask may include a plurality of second motion masks. The motion mask generator may be further configured to generate at least one third motion mask of the plurality of current image frames based on the first motion masks and the second motion masks, and generate the final motion mask based on the at least one third motion mask.

The plurality of current image frames may include a first current image frame captured by using a first exposure and a second current image frame captured by using a second exposure, wherein the motion mask generator may be further configured to generate the final motion mask including at least one of the third motion mask of the first current image frame and the third motion mask of the second current image frame.

According to one or more exemplary embodiments, there is provided a method of detecting a motion mask which may include: detecting at least one first motion mask by calculating a local feature of each pixel included in a partial or entire area of at least one current image frame which indicates a pixel value relationship between the each pixel and at least one neighboring pixel, and comparing the calculated local feature with a local feature of a corresponding pixel of at least one previous image frame; detecting at least one second motion mask based on a difference between the partial or entire area of the current image frame and a corresponding area of the previous image frame; and generating a final motion mask including at least one of the first motion mask and the second motion mask.

The detecting the first motion mask may include excluding from the first motion mask a pixel by determining whether a difference between a maximum pixel value and a minimum pixel value from among pixel values of neighboring pixels of the pixel exceeds a preset critical value.

The detecting the first motion mask may include detecting a pixel as the first motion mask by determining whether a number of local features of the pixel, which are the same as local features of a corresponding pixel in the previous frame, is equal to or less than a preset critical value.

The detecting the second motion mask may include detecting a pixel as the second motion mask by determining a difference between the pixel in the current image frame and a corresponding pixel in the previous image frame is equal to or greater than a preset critical value.

The generating the final motion mask may include generating, as the final motion mask, a common area in the current image frame between the first motion mask and the second motion mask or an area including both the first motion mask and the second motion mask.

The at least one current image frame may include a plurality of current image frames captured by using different exposures, the at least one first motion mask may include a plurality of first motion masks, and the at least one second motion mask may include a plurality of second motion masks. The generating the final motion mask may include generating at least one third motion mask of the plurality of current image frames based on the first motion masks and the second motion masks, and generating the final motion mask based on the at least one third motion mask.

The plurality of current image frames may include a first current image frame captured at a first exposure level and a second current image frame captured at a second exposure level, wherein the generating the final motion mask may include generating the final motion mask including at least one of the third motion mask of the first current image frame and the third motion mask of the second current image frame.

According to one or more exemplary embodiments, other methods, other systems, and other computer-readable recording media have embodied thereon computer programs for executing the methods are provided.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE EXEMPLARY EMBODIMENTS

The inventive concept may be implemented by various exemplary embodiments and modifications thereto, and these embodiments will be illustrated in the drawings and described herein in detail. The effects and features of these embodiments will become apparent from the following description of the embodiments, taken in conjunction with the accompanying drawings. However, the inventive concept is not limited to the embodiments described below, and may be embodied in various modes.

Reference will now be made in detail to the exemplary embodiments which are illustrated in the accompanying drawings. In the drawings, the same elements are denoted by the same reference numerals, and a repeated explanation thereof will not be given.

It will be understood that although the terms "first", "second", etc. may be used herein to describe various components, these components should not be limited by these terms. These components are only used to distinguish one component from another.

As used herein, the singular forms "a", "an" and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

When a certain embodiment may be implemented differently, a specific process order may be performed differently from the described order. For example, two consecutively described processes may be performed substantially at the same time or performed in an order opposite to the described order.

As used herein, the term "and/or" includes any and all combinations of one or more of the associated listed items. Expressions such as "at least one of," when preceding a list of elements, modify the entire list of elements and do not modify the individual elements of the list.

Figure 1:
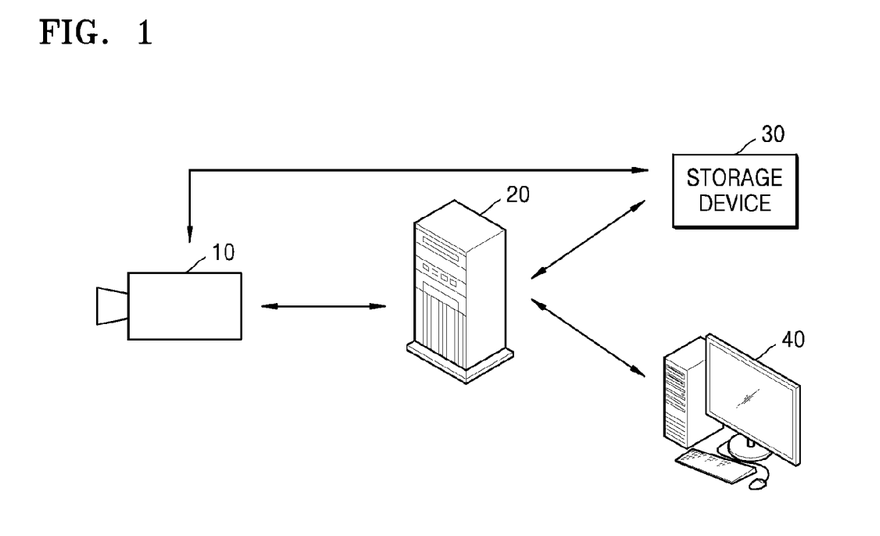
FIG. 1 is a view of a monitoring system according to an exemplary embodiment.

FIG. 1 is a view of a monitoring system 1, according to an exemplary embodiment.

Referring to FIG. 1, the monitoring system 1 according to an exemplary embodiment may include a camera 10, a server 20, a storage device 30, and a terminal 40. For a better understanding of the present exemplary embodiment, only some elements of the monitoring system 1 are illustrated in FIG. 1.

Referring to FIG. 1, the camera 10 captures an image of a monitoring zone and transmits the image to the server 20, and the server 20 stores the image in the storage device 30 or transmits the image to the terminal 40. The terminal 40 may receive the image from the storage device 30. The camera 10, the server 20, the storage device 30, and the terminal 40 may be connected to one another through a network.

The camera 10 may be directly connected to the storage device 30. For example, the image captured by the camera 10 may be directly transmitted to the storage device 30 through a wired or wireless network, and the storage device 30 may store the image. Alternatively, the camera 10 may obtain data stored in the storage device 30 from the storage device 30.

The camera 10 obtains an image signal of a zone to be photographed at a predetermined exposure level. The camera 10 may be a surveillance camera that may photograph a zone in real time for monitoring or security purposes. The camera 10 may be a pan-tilt-zoom (PTZ) camera that is equipped with a pan-tilt device for panning and tilting the camera, and also adjusts a zoom ratio of a lens. Although only one camera 10 is illustrated in FIG. 1 for convenience of explanation, the monitoring system 1 may include a plurality of cameras and the plurality of cameras may photograph the same monitoring zone at a predetermined exposure level.

The server 20 may receive an image from the camera 10, may output the image, may generate a header of the image, and may control the camera 10 or the storage device 30 according to a request of the terminal 40. The server 20 will be explained below in detail with reference to FIGS. 2 and 3.

The storage device 30 that may be store an image may be a hard disc or a solid-state disc (SSD). However, it will be understood by one of ordinary skill in the art that the present exemplary embodiment is not limited thereto, and the storage device 30 may be another type of storage medium that may store data.

The terminal 40 is a device that may transmit and receive data to and from the server 20 and/or the storage device 30 in a wired/wireless communication environment. The terminal 40 may be a user's personal computer (PC) or mobile terminal. Although as shown in FIG. 1 the terminal 40 is a PC, the present exemplary embodiment is not limited thereto and any terminal on which an interface for data communication is mounted may be used without limitation. The terminal 40 includes a display that displays images and an input module that receives data from the user. Examples of the input module may include, but are not limited to, a keyboard, a mouse, a trackball, a microphone, buttons, and a touch panel.

Figure 2:
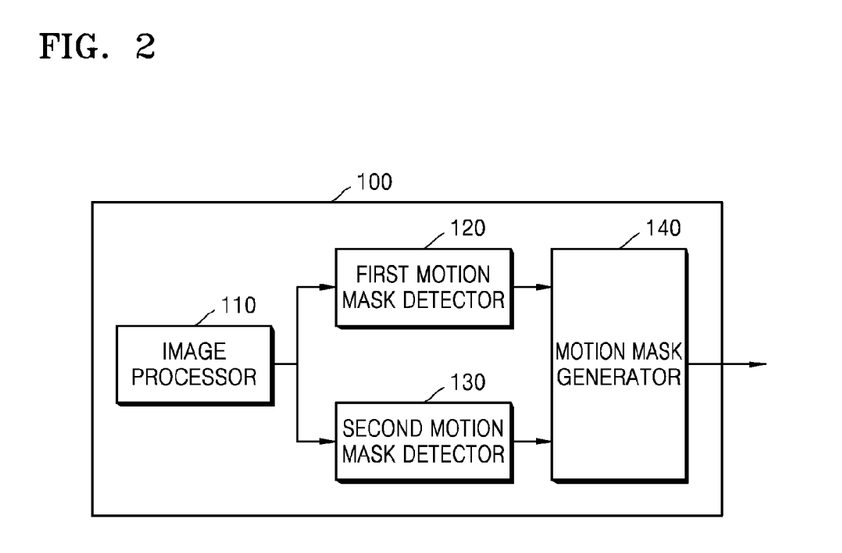
FIG. 2 is a block diagram of a configuration of an apparatus for detecting a motion mask that may be provided in a server of FIG. 1, according to an exemplary embodiment.

FIG. 2 is a block diagram of a configuration of an apparatus 100 for detecting a motion mask, according to an exemplary embodiment. The apparatus 100 may be provided in the server 20 of FIG. 1, according to an exemplary embodiment.

The apparatus 100 may correspond to at least one processor or may include at least one processor, according to an exemplary embodiment. The apparatus 100 may be driven by being included in a hardware device such as a general-purpose computer system, or may be mounted on the server 20, according to another exemplary embodiment.

Referring to FIG. 2, the apparatus 100 may include an image processor 110, a first motion mask detector 120, a second motion mask detector 130, a motion mask generator 140, and an image generator (not shown).

The image processor 110 generates reduced image frame, e.g., downsampled image frames, by reducing image frames that are sequentially input through a camera. The image processor 110 may store the reduced image frames in a frame memory (not shown).

The first motion mask detector 120 may calculate in real time a local feature indicating a pixel value relationship between all or some pixels in a current image frame, may compare the local feature of the current image frame with a local feature of a previous image frame, and may detect an area having different local features as a motion mask. The first motion mask detector 120 may calculate a local feature of each pixel in a partial or entire area of a current reduced image frame indicating a pixel value relationship between each pixel and neighboring pixels or a pixel value relationship between neighboring pixels of each pixel in the partial or entire area of the current reduced image frame, may compare the calculated local feature with a local feature of a corresponding pixel of a previous reduced image frame, and may detect a first motion mask. The first motion mask detector 120 may calculate a pixel value relationship by performing any of various methods on a pixel value of a current image frame. In the present exemplary embodiment, the partial area of the current reduced image frame may be predetermined or variably determined by the apparatus 100 for detecting a motion mask subject to an image capturing environment.

The term 'current reduced image frame' refers to an image frame that is obtained by reducing an image frame that is currently input, the term 'previous reduced image frame' refers to an image frame that is obtained by reducing one of image frames that are previously input, and the term 'local feature' refers to a value indicating a relationship between pixel values of pixels that are entirely or partially included in an area of an image frame, and may be whether there is an increase/decrease between a pixel value of one representative pixel from among the pixels that are included in the area and pixel values of neighboring pixels of the representative pixel, the amount of the increase/decrease, or a ratio of the pixel values of the neighboring pixels to the pixel value of the representative pixel. Also, the term 'corresponding pixel' refers to a pixel that is located at the same position in an image frame.

Also, the first motion mask detector 120 may detect a pixel having an ineffective pixel value by calculating whether a difference between a maximum pixel value and a minimum pixel value from among pixel values of neighboring pixels of a representative pixel in a current reduced image frame exceeds a preset critical value, and when it is determined that the difference exceeds the preset critical value, the first motion mask detector 120 may exclude the representative pixel from a first motion mask. The representative pixel may be any pixel in a current reduced image frame.

A process of calculating a local feature will now be explained in more detail. The first motion mask detector 120 may select four pixels that are located in a horizontal direction and a vertical direction of a representative pixel that is included in a current reduced image frame as neighboring pixels, may randomly select two pixels from among the four neighboring pixels, and may calculate a difference between pixel values of the two pixels. Since a total number of cases where two neighboring pixels are selected from the four neighboring pixels is 6 (6=4×3/2), six local features may be calculated through the process with respect to each pixel. Six local features are calculated for a previous reduced image frame by performing the same process on the previous reduced image frame. A local feature of the representative pixel of the current reduced image frame which is calculated through the process may be compared with a local feature of a corresponding pixel of the previous reduced image frame, and when it is determined that the local features are different from each other, the representative pixel may be included in a motion mask. In another exemplary embodiment, when a local feature of a pixel indicates a pixel value relationship between two pixels neighboring the pixel or between the pixel and one neighboring pixel, if the number of the local features of a pixel in the current reduced image frame, which are the same as local features of a corresponding pixel in the previous reduced image frame, is equal to or greater than a preset critical value, the first motion mask detector 120 may include the pixel in the motion mask. The first motion mask detector 120 may detect the motion mask in the current reduced image frame by performing the process on all pixels that are included in the current reduced image frame.

In another exemplary embodiment, the first motion mask detector 120 may calculate a difference between pixel values of pixels that are included in a partial or entire area of a current image frame as a local feature or an order of size of the pixel values of the pixels that are included in the partial or entire area of the current image frame as a local feature.

The second motion mask detector 130 may detect a second motion mask based on a difference between a partial or entire area of a current reduced image frame and a corresponding area of a previous reduced image frame. The second motion mask detector 130 may detect a pixel for which a difference between the partial or entire area of the current reduced image frame and the corresponding area of the previous reduced image frame is not 0 or is equal to or greater than a preset critical value as a pixel included in the second motion mask.

When an object moves, since a position of the object in a previous image frame and a position of the object in a current image frame are different from each other, in order to detect an area of the moving object, the first motion mask detector 120 and the second motion mask detector 130 may compare an image frame that is currently input with an image frame that is previously input, and may detect an area having different pixel values as a motion mask. The motion mask generator 140 may generate a motion mask including at least one of a first motion mask that is detected by using a local feature indicating a pixel value relationship of pixels that are included in temporarily adjacent reduced image frames and a second motion mask that is detected by using a difference between the adjacent reduced image frames as a final motion mask. The motion mask generator 140 may generate an area including both the first motion mask and the second motion mask as the final motion mask or may generate a common area between the first motion mask and the second motion mask as the final motion mask. The motion mask generator 140 generate a motion mask that is obtained by applying weights to the first motion mask and the second motion mask and summing the weighted first motion mask and the weighted second motion mask as the final motion mask. Since the motion mask generator 140 generates an area including both the first motion mask and the second motion mask as the final motion mask, a motion mask may be detected without omission.

The image generator (not shown) may generate a final image frame by merging the final motion mask with a background image. The background image may be one image frame that is selected from among a plurality of image frames that are used to generate the final motion mask. The image generator may convert the final motion mask into an area having the same resolution as that of the background image and/or having a corresponding size in the background image, and then may merge the final motion mask with the background image. The image generator may generate the final image frame by replacing a pixel value in the final motion mask with a pixel value obtained by merging pixel values in the same area of the plurality of image frames. The image generator merges the pixel values in the same area of the plurality of image frames to generate a final image frame as described above in order to increase visibility of the detected motion area. The image generator may also generate a final image frame by filling in the detected motion area with a partial pixel value to increase visibility of the detected motion area. The image generator may increase visibility of the motion area by applying weights to a luminosity, a saturation, and a contrast of each pixel included in each of the plurality of image frames, by adding the weighted luminosity, the weighted saturation, and the weighted contrast and by replacing pixel values of pixels of the motion mask with the added values. Various methods of generating an image frame having high visibility which are well known to one of ordinary skill in the art may be used, and a detailed explanation thereof will not be given.

When an apparatus for detecting a motion mask detects a motion mask by using only a difference between image frames captured at different times, the apparatus may wrongly detect a pixel having different pixel values in different image frames as a motion mask. In order to address this problem, the apparatus 100 further performs a process of calculating a local feature of pixels indicating a pixel value relationship of the pixels that are included in an image frame, comparing the calculated local feature with a local feature of corresponding pixels of a previous image frame, and detecting a pixel having different local features as a pixel in a motion mask, and detects a motion mask in consideration of both an area having different pixel values and a motion mask obtained through the comparison of the local features as a final motion mask.

Also, the apparatus 100 detects a motion mask by using reduced image frames that are obtained by reducing image frames. Accordingly, the apparatus 100 may remove noise that is included in the image frames, reduce a number of times local features are calculated and compared with one another, and reduce a time and resources necessary to calculate and compare the local features. However, the apparatus 100 may not be configured to reduce the image frames for the above motion detecting operations if the noise reduction is not necessary or the apparatus 100 comprises a higher-specification processor, according to another exemplary embodiment.

Figure 3:
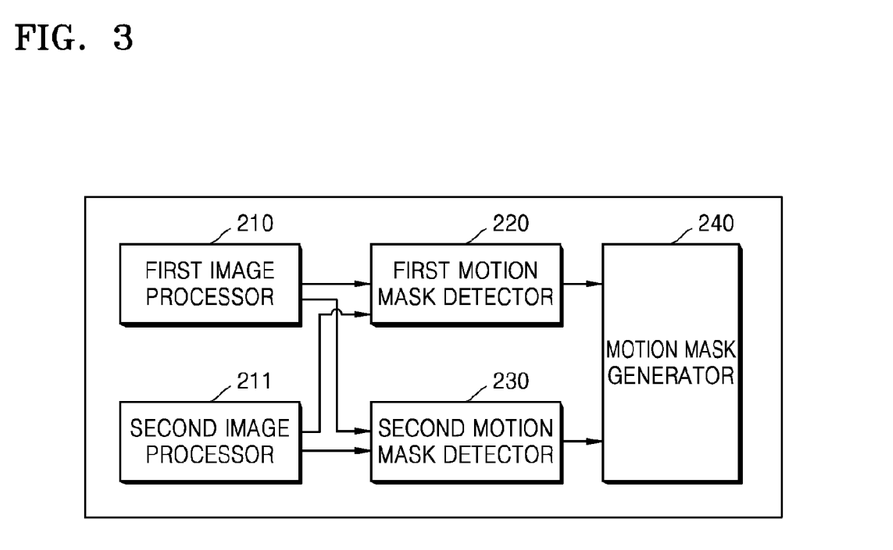
FIG. 3 is a block diagram of a configuration of an apparatus for detecting a motion mask that may be included in the server of FIG. 1, according to another exemplary embodiment.

FIG. 3 is a block diagram illustrating a configuration of an apparatus 200 for detecting a motion mask that may be provided in the server 20 of FIG. 1, according to another exemplary embodiment. The apparatus 200 may detect a final motion mask by obtaining a plurality of image frames having different exposure levels for a same monitoring zone and detecting a motion mask of each of the plurality of image frames.

Referring to FIG. 3, the apparatus 200 may include a first image processor 210, a second image processor 211, a first motion mask detector 220, a second motion mask detector 230, a motion mask generator 240, and an image generator (not shown).

The first image processor 210 generates reduced image frames by reducing image frames that are captured by using a first exposure and are sequentially input. The second image processor 211 generates reduced image framed by reducing image frames that are captured by using a second exposure and are sequentially input. According to an exemplary embodiment, the image frames are captured by using the first exposure and the second exposure to achieve high dynamic range (HDR) imaging with respect to the same monitoring zone from a single camera.

For convenience of explanation, the image frames that are captured by using the first exposure are referred to as first image frames, the reduced image frames that are generated by the first image processor 210 are referred to as first reduced image frames, the image frames that are captured by using the second exposure are referred to as second image frames, and the reduced image frames that are generated by the second image processor 211 are referred to as second reduced image frames. The terms 'first and second' are used to distinguish images that are captured by using different exposures.

The first motion mask detector 220 detects a first motion mask of each of a plurality of reduced image frames that are generated by the first image processor 210 and the second image processor 211. The first motion mask detector 220 detects the first motion mask for the first exposure by calculating a local feature indicating a pixel value relationship between each pixel in a partial or entire area of a reduced image frame (hereinafter, referred to as a 'first current reduced image frame') obtained by reducing a first image frame that is currently input (hereinafter, referred to as a 'first current image frame') and neighboring pixels and comparing the calculated local feature with a local feature indicating a pixel value relationship between each pixel in a corresponding area of a reduced image frame (hereinafter, referred to as a 'first previous reduced image frame') obtained by reducing a first image frame that is previously input (hereinafter, referred to as a 'first previous image frame') and neighboring pixels. The first motion mask detector 220 detects the first motion mask for the second exposure by calculating a local feature indicating a pixel value relationship between each pixel in the corresponding area of a reduced image frame (hereinafter, referred to as a 'second current reduced image frame') obtained by reducing a second image frame that is currently input (hereinafter, referred to as a 'second current image frame') and neighboring pixels and comparing the calculated local feature with a local feature indicating a pixel value relationship between each pixel in the corresponding area of a reduced image frame (hereinafter, referred to as a 'second previous reduced image frame') obtained by reducing a second image frame that is previously input (hereinafter, referred to as a 'second previous image frame') and neighboring pixels.

Figure 7:
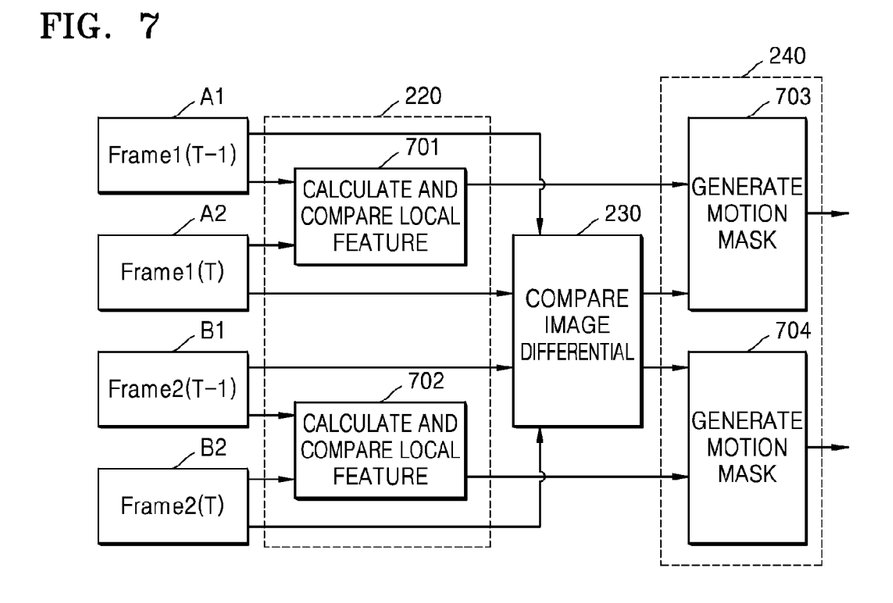
FIG. 7 is a block diagram of a first motion mask detector, a second motion mask detector, and a motion mask generator, for explaining a method of detecting a motion mask, according to an exemplary embodiment.

FIG. 7 is a block diagram of the first motion mask detector 220, the second motion mask detector 230, and the motion mask generator 240, according to an exemplary embodiment.

An operation of the first motion mask detector 220 configured to detect the first motion mask will now be explained with reference to FIGS. 3 and 7. The first motion mask detector 220 may include a first detector 701 that detects a first motion mask of an image frame that is captured by using a first exposure and a second detector 702 that detects a first motion mask of an image frame that is captured by using a second exposure. Although the first detector 701 and the second detector 702 are separately illustrated, the first detector 701 and the second detector 702 may be implemented as a single unit or module. The first detector 701 detects an area AM1 as the first motion mask of the first exposure by receiving a first current reduced image frame A2, calculating a local feature indicating a pixel value relationship between each pixel of a partial or entire area the first current reduced image frame A2 and neighboring pixels of the each pixel, receiving a first previous reduced image frame A1, and comparing the calculated local feature with a local feature of a corresponding pixel of the first previous reduced image frame A1. The second detector 702 detects an area BM1 as the first motion mask of the second exposure by receiving a second current reduced image frame B2, calculating a local feature indicating a pixel value relationship between each pixel of a corresponding area of the second current reduced image frame B2 and neighboring pixels of the each pixel, receiving a second previous reduced image frame B1, and comparing the calculated local feature with a local feature of a corresponding pixel of the second previous reduced image frame B1.

A method of calculating a local feature indicating a pixel value relationship has already been explained, and thus a detailed explanation thereof will not be given.

The second motion mask detector 230 detects a second motion mask of each of a plurality of reduced image frames. The second motion mask detector 230 calculates a difference between the first current reduced image frame A2 and the first previous reduced image frame A1 and detects an area in which the difference is not 0 or is equal to or greater than a first preset critical value as the second motion mask of a first exposure image. The second motion mask detector 230 may detect a difference between the second current reduced image frame B2 and the second previous reduced image frame B1 and may detect an area in which the difference is not 0 or is equal to or greater than a second preset critical value as the second motion mask of a second exposure image. Here, the first preset critical value may be the same as or different from the second preset critical value.

An operation of the second motion mask detector 230 will now be explained with reference to FIGS. 3 and 7. The second motion mask detector 230 calculates a difference between the first current reduced image frame A2 and the first previous reduced image frame A1, and detects an area AM2 in which the calculated difference is not 0 or is equal to or greater than the first preset critical value as the second motion mask of the first exposure. Also, the second motion mask detector 230 calculates a difference between the second current reduced image frame B2 and the second previous reduced image frame B1 and detects an area BM2 in which the calculated difference is not 0 or is equal to or greater than the second preset critical value as the second motion mask of the second exposure.

A method of detecting a motion mask in consideration of a difference between reduced image frames has already been explained, and thus a detailed explanation thereof will not be given.

The motion mask generator 240 generates a final motion mask including at least one of the first motion mask and the second motion mask. The motion mask generator 240 generates a third motion mask including at least one of the first motion mask and the second motion mask that are detected from the image frames that are captured by using the first exposure. The motion mask generator 240 generates a third motion mask including at least one of the first motion mask and the second motion mask that are detected by the image frames that are captured by using the second exposure. The motion mask generator 240 may generate the final motion mask including at least one of the third motion mask of the image frames that are captured by using the first exposure and the third motion mask of the image frames that are captured by using the second exposure.

An operation of the motion mask generator 240 will now be explained with reference to FIGS. 3 and 7. The motion mask generator 240 may include a first generator 703 that generates a third motion mask from image frames that are captured by using a first exposure, and a second generator 704 that generates a third motion mask from image frames that are captured by using a second exposure. Although the first generator 703 and the second generator 704 are separately illustrated, the first generator 703 and the second generator 704 may be included in one device. The first generator 703 may generate a third motion mask AM3 including at least one of the first motion mask AM1 and the second motion mask AM2 that are detected by using the first previous reduced image frame A1 and the first current reduced image frame A2, and the second generator 704 may generate a third motion mask BM3 including at least one of the first motion mask BM1 and the second motion mask BM2 that are detected by using the second previous reduced image frame B1 and the second current reduced image frame B2. The motion mask generator 240 finally generates a motion mask including at least one of the third motion mask AM3 for the first exposure and the third motion mask BM3 for the second exposure as a final motion mask. The apparatus 200 may further include an image generator (not shown). The image generator may generate a final image frame by replacing a pixel value in the third motion mask with a pixel value that combines pixel values in the same area of the plurality of image frames in order to increase visibility of the image frames of a monitoring zone. A method of selecting one image frame from among the plurality of image frames by using the image generator has already been explained, and thus a detailed explanation thereof will not be given.

As described above, the present exemplary embodiment may be applied to HDR imaging that involves merging images that are captured at a plurality of exposure levels. A plurality of image frames obtained after the same monitoring zone is photographed at a plurality of exposure levels are merged to provide one image frame. During this process, the same object that is included in the plurality of image frames may be recognized as a different object, and thus ghosting artifact in which an image is mistakenly regarded as a doctored or deformed image may occur.

The apparatus 200 may accurately detect a moving object by comparing pixel value relationships between pixels of adjacent image frames from image frames that are captured by using different exposures and by using a difference between the adjacent image frames, and may prevent an area having a motion from being omitted.

Although the first image processor 210 and the second image processor 211 are separately explained in FIG. 3, one image processor into which the first image processor 210 and the second image processor 211 are integrated may simultaneously or sequentially reduce a plurality of exposure image frames.

Also, although a motion mask is detected from image frames having different exposures in FIG. 3, the present exemplary embodiment is not limited thereto, and a third motion mask may be generated by detecting a first motion mask and a second motion mask from each of a plurality of different exposure image frames, for example, four different exposure image frames, and a final motion mask may be detected based on the four third motion masks.

Figure 4:
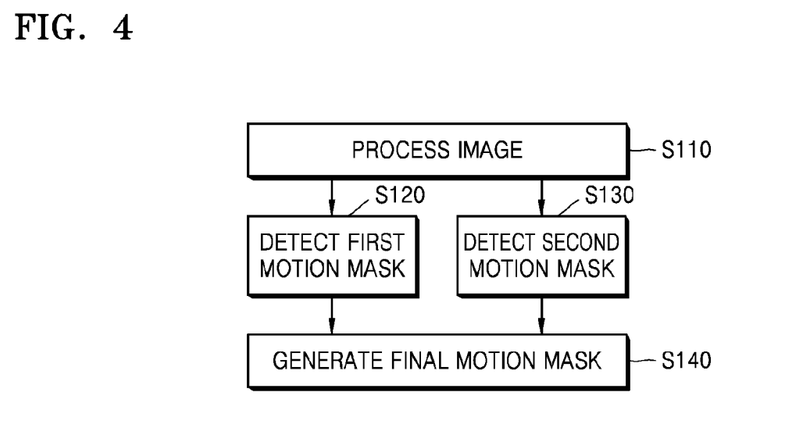
FIGS. 4 and 5 are flowcharts of methods of detecting motion masks, according to exemplary embodiments.

FIG. 4 is a flowchart of a method of detecting a motion mask, according to an exemplary embodiment.

Referring to FIG. 4, the method may include operation S110 in which an image is processed, operation S120 in which a first motion mask is detected, operation S130 in which a second motion mask is detected, and operation S140 in which a final motion mask is generated.

In operation S110, an apparatus for detecting a motion mask generates reduced image frames by reducing input image frames that are captured by using a predetermined exposure.

In operation s120, a first motion mask is detected by calculating a local feature indicating a pixel value relationship between each pixel in a partial or entire area of a current reduced image frame that is generated in operation S110 and neighboring pixels and comparing the calculated local feature with a local feature of a corresponding pixel of a previous reduced image frame that is generated in operation S110. A method of calculating a local feature indicating a pixel value relationship has already been explained, and thus a detailed explanation thereof will not be given.

In operation S130, the apparatus calculates a between the current reduced image frame and the previous reduced image frame that are generated in operation S110 and detects an area in which the calculated difference is not 0 or is equal to or greater than a preset critical value as a second motion mask.

In operation S140, the apparatus detects a motion mask including at least one of the first motion mask and the second motion mask that are detected from the current reduced image frame as a final motion mask.

Figure 5:
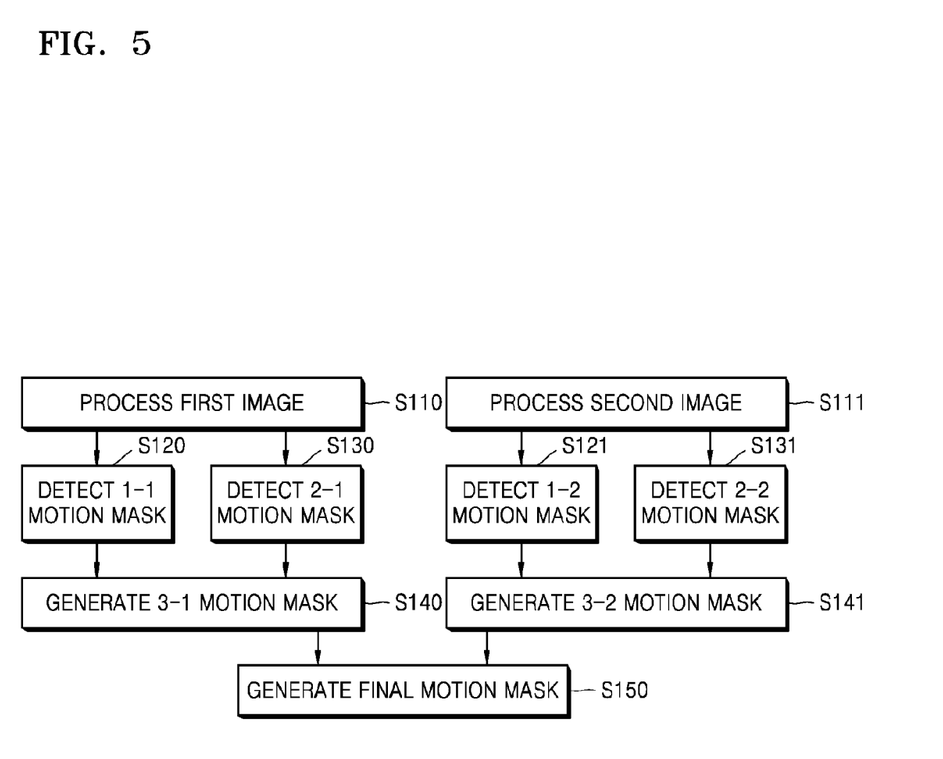
Figure 6:
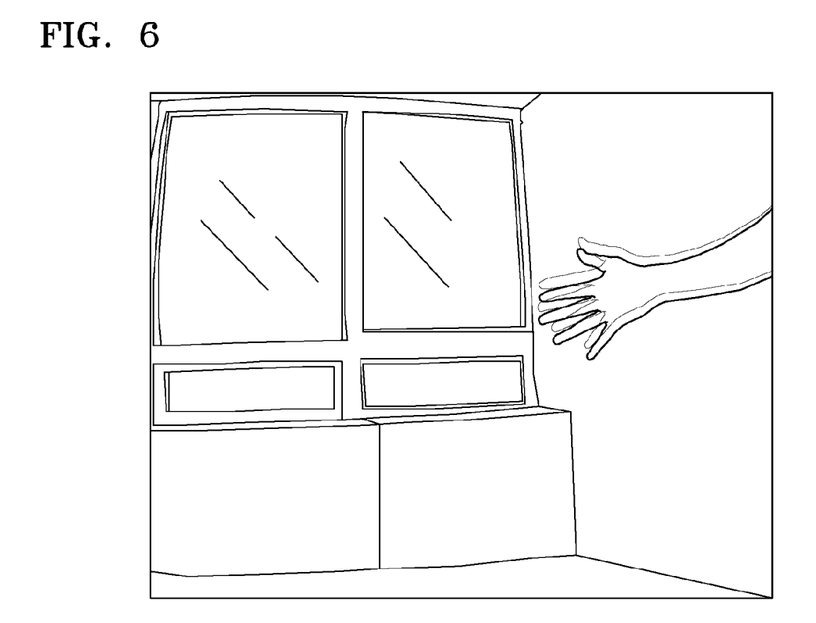
FIG. 6 is a view illustrating an image frame that has ghosting artifact.

FIG. 5 is a flowchart of a method of detecting a motion mask, according to another exemplary embodiment.

Referring to FIG. 5, the method may include operation S110 in which a first image is processed, operation S111 in which a second image is processed, operation S120 in which a 1-1 motion mask is detected, operation S121 in which a 1-2 motion mask is detected, operation S130 in which a 2-1 motion mask is detected, operation S131 in which a 2-2 motion mask is detected, operation S140 in which a 3-1 motion mask is detected, operation S141 in which a 3-2 motion mask is detected, and operation S150 in which a final motion mask is generated.

In operation S110, an apparatus for detecting a motion mask generates a first current reduced image frame by reducing a current input image frame that is captured by using a first exposure. In operation S111, the apparatus generates a second current reduced image frame by reducing a current input image frame that is captured by using a second exposure.

In operation S120, the apparatus detects a 1-1 motion mask by calculating a local feature indicating a pixel value relationship between each pixel in a partial or entire area of the first current reduced image frame and neighboring pixels and comparing the calculated local feature with a local feature of a corresponding pixel of a first previous reduced image frame. A method of calculating a local feature indicating a pixel value relationship has already been explained, and thus a detailed explanation thereof will not be given.

In operation S121, the apparatus detects a 1-2 motion mask by calculating a local feature indicating a pixel value relationship between each pixel in a corresponding area of the second current reduced image frame and neighboring pixels and comparing the calculated local feature with a local feature of a corresponding pixel of a second previous reduced image frame.

In operation S130, the apparatus calculates a difference between the first current reduced image frame and the first previous reduced image frame and detects an area in which the calculated difference is not 0 or is equal to or greater than a preset critical value as a 2-1 motion mask.

In operation S131, the apparatus calculates a difference between the second current reduced image frame and the second previous reduced image frame and detects an area in which the calculated difference is not 0 or is equal to or greater than the preset critical value as a 2-2 motion mask.

In operation S140, the apparatus detects a motion mask including at least one of the 1-1 motion mask and the 2-1 motion mask that are detected from the first current reduced image frame as a 3-1 motion mask.

In operation S141, the apparatus detects a motion mask including at least one of the 1-2 motion mask and the 2-2 motion mask that are detected from the second current image frame as a 3-2 motion mask.

In operation S150, the apparatus detects a motion mask including at least one of the 3-1 motion mask that is detected by using the first current reduced image frame and the 3-2 motion mask that is detected by using the second current reduced image frame as a final motion mask.

The method according to the present exemplary embodiment may further include an operation of generating an image (not shown), and thus may generate a final image frame by partially merging a plurality of image frames that are obtained by capturing image data in a final motion mask at a plurality of exposure levels in order to increase visibility.

The apparatus and method of detecting a motion mask according to the one or more exemplary embodiments detects a motion mask by obtaining images that are captured at different luminances from a camera and obtaining a difference between two image frames that are continuously captured at each luminance. Alternatively, the apparatus and method may detect a motion mask by determining whether a difference between local features exists by using a local feature between pixels. When both the process of detecting a motion mask by using a difference between adjacent image frames and the process of detecting a motion mask by using a local feature are used, even when an image includes an area having a relatively low contrast value, a robust motion mask may be detected by analyzing a local feature and an image difference.

Figure 8A:
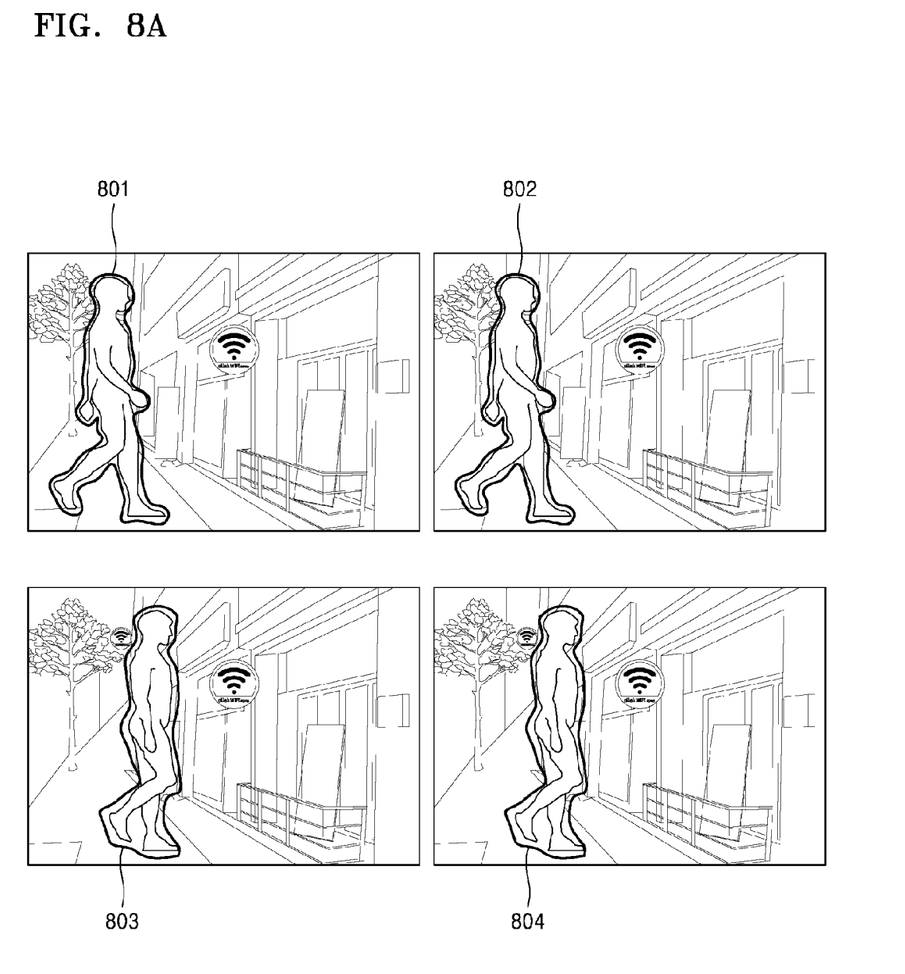
FIG. 8A is a view of a motion mask detected by the apparatus of FIG. 3, according to an exemplary embodiment.
Figure 8B:
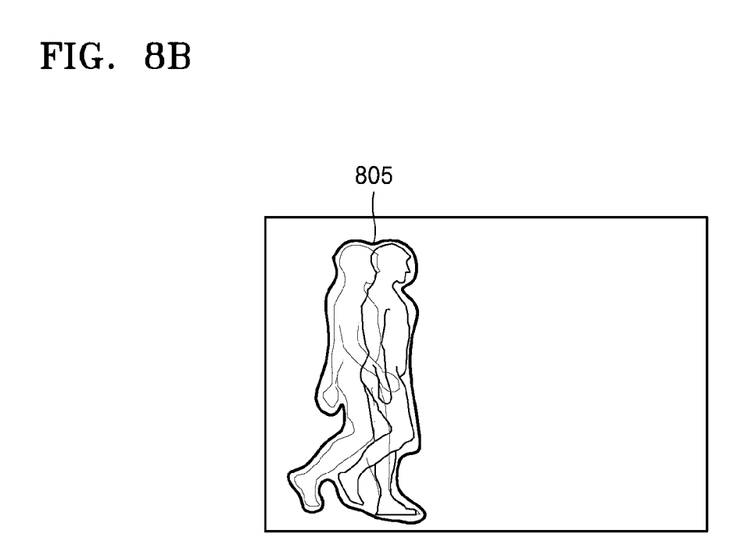
FIGS. 8B and 8C are views illustrating motion masks generated by motion mask generators, according to an exemplary embodiment.
Figure 8C:
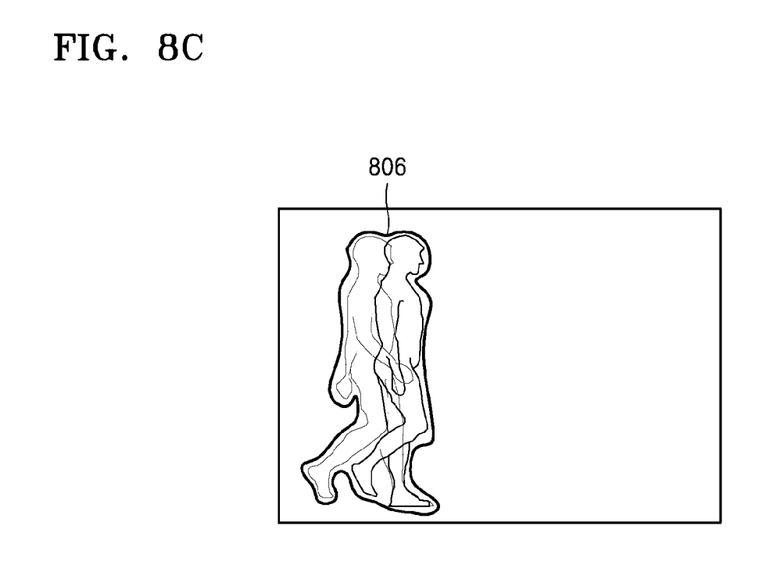

FIGS. 8A through 8C are views of a motion mask detected and generated by the apparatus 200, according to an exemplary embodiment.

The apparatus 200 may detect a first motion mask 801 by calculating a local feature indicating a pixel value relationship of each pixel from a plurality of image frames that are captured by using a first exposure and comparing the calculated local feature with a local feature of a previous image frame, and may detect a second motion mask 803 by using a difference between the plurality of image frames that are captured by using the first exposure. The apparatus 200 generates an area including the first and second motion masks 801 and 803 as a third motion mask 805. The apparatus 200 may detect a first motion mask 802 by calculating a local feature indicating a pixel value relationship of each pixel from a plurality of image frames that are captured by using a second exposure and comparing the calculated local feature with a local feature of a previous image frame, and may detect a second motion mask 804 by using a difference between the plurality of image frames that are captured by using the second exposure. The apparatus 200 generates a third motion mask 806 including both the first and second motion masks 802 and 804. Finally, the apparatus 200 generates an area including at least one of the third motion masks 805 and 806 as a final motion mask.

According to the apparatus and method of one or more of the above exemplary embodiments, an area and a motion between objects may be relatively easily separated even when a background area is bright and image frames having different luminances may be obtained, a difference between the image frames may be calculated, and a local feature may be calculated.

The present exemplary embodiment may be applied to HDR imaging that involves merging images that are captured at a plurality of exposure levels. The apparatus and method according to the present exemplary embodiment may relatively accurately detect a moving object by applying a plurality of motion detection algorithms to corresponding image frames that are captured by using different exposures and may prevent an area having a motion from being omitted.

As described above, according to one or more of the above exemplary embodiments, the apparatus and method of detecting a motion mask may easily detect a motion mask that exists in an area having a relatively low contrast and may generate an image without ghosting artifact.

The method of the inventive concept may be implemented as computer instructions which may be executed by various computer means, and recorded on a computer-readable recording medium. The computer-readable recording medium may include program commands, data files, data structures, or a combination thereof. The program commands recorded on the computer-readable recording medium may be specially designed and constructed for the inventive concept or may be known to and usable by one of ordinary skill in a field of computer software. Examples of the computer-readable medium include storage media such as magnetic media (e.g., hard discs, floppy discs, or magnetic tapes), optical media (e.g., compact disc-read only memories (CD-ROMs), or digital versatile discs (DVDs)), magneto-optical media (e.g., floptical discs), and hardware devices that are specially configured to store and carry out program commands (e.g., ROMs, RAMs, or flash memories). Examples of the program commands include a high-level language code that may be executed by a computer using an interpreter as well as a machine language code made by a complier.

At least one of the components, elements or units represented by a block as illustrated in FIGS. 2, 3 and 7 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

The particular implementations shown and described herein are illustrative examples of the inventive concept and are not intended to otherwise limit the scope of the inventive concept in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the inventive concept unless the element is specifically described as "essential" or "critical".

The use of the terms "a" and "an" and "the" and similar referents in the context of describing the inventive concept (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The inventive concept is not limited to the described order of the steps. The use of any and all examples, or exemplary language (e.g., "such as") provided herein, is intended merely to better illuminate the inventive concept and does not pose a limitation on the scope of the inventive concept unless otherwise claimed. Numerous modifications and adaptations will be readily apparent to one of ordinary skill in the art without departing from the spirit and scope of the inventive concept.

What is claimed is:

1. An apparatus for detecting a motion mask, the apparatus comprising:
    an image processor configured to generate a plurality of image frames;
    a first motion mask detector configured to detect at least one first motion mask by calculating a local feature of each pixel included in a partial or entire area of at least one current image frame which indicates a pixel value relationship between the each pixel and at least one neighboring pixel, and comparing the calculated local feature with a local feature of a corresponding pixel of at least one previous image frame;
    a second motion mask detector configured to detect at least one second motion mask based on a difference between the partial or entire area of the current image frame and a corresponding area of the previous image frame; and
    a motion mask generator configured to generate a final motion mask comprising at least one of the first motion mask and the second motion mask.

2. The apparatus of claim 1, wherein the first motion mask detector is further configured to exclude from the first motion mask a pixel by determining whether a difference between a maximum pixel value and a minimum pixel value from among pixel values of neighboring pixels of the pixel exceeds a preset critical value.

3. The apparatus of claim 1, wherein a local feature of a pixel in the current image frame indicates a pixel value relationship between two pixels among the pixel and neighboring pixels of the pixel, and
    wherein the first motion mask detector is further configured to detect a pixel as the first motion mask by determining whether a number of local features of the pixel, which are the same as local features of a corresponding pixel in the previous frame, is equal to or less than a preset critical value.

4. The apparatus of claim 1, wherein the second motion mask detector is further configured to detect a pixel as the second motion mask by determining a difference between the pixel in the current image frame and a corresponding pixel in the previous image frame is equal to or greater than a preset critical value.

5. The apparatus of claim 1, wherein the motion mask generator is configured to generate, as the final motion mask, a common area in the current image frame between the first motion mask and the second motion mask or an area comprising both the first motion mask and the second motion mask.

6. The apparatus of claim 1, wherein the at least one current image frame comprises a plurality of current image frames captured by using different exposures, the at least one first motion mask comprises a plurality of first motion masks, and the at least one second motion mask comprises a plurality of second motion masks, and
    wherein the motion mask generator is configured to generate at least one third motion mask of the plurality of current image frames based on the first motion masks and the second motion masks, and generate the final motion mask based on the at least one third motion mask.

7. The apparatus of claim 6, wherein the plurality of current image frames comprise a first current image frame captured by using a first exposure and a second current image frame captured by using a second exposure, and
    wherein the motion mask generator is further configured to generate the final motion mask comprising at least one of the third motion mask of the first current image frame and the third motion mask of the second current image frame.

8. The apparatus of claim 7, wherein the motion mask generator is configured to generate the third motion mask of the first current image frame based on at least one of the first and second motion masks of the first current image frame, and generate the third motion mask of the second current image frame based on the first and second motion masks of the second current image frame.

9. The apparatus of claim 1, wherein the at least one current image frame comprises first and second of current image frames captured using first and second exposure, respectively, and
    wherein the at least one first motion mask comprises a first motion mask of the first current image frame and a first motion mask of the second current image frame.

10. The apparatus of claim 9, wherein the at least one second motion mask comprises a second motion mask of the first current image frame and a second motion mask of the second current image frame.

11. The apparatus of claim 1, wherein the plurality of image frames are downsampled image frames.

12. A method of detecting a motion mask, the method comprising:
    detecting at least one first motion mask by calculating a local feature of each pixel included in a partial or entire area of at least one current image frame which indicates a pixel value relationship between the each pixel and at least one neighboring pixel, and comparing the calculated local feature with a local feature of a corresponding pixel of at least one previous image frame;

detecting at least one second motion mask based on a difference between the partial or entire area of the current image frame and a corresponding area of the previous image frame; and generating a final motion mask comprising at least one of the first motion mask and the second motion mask.

13. The method of claim 12, wherein the detecting the first motion mask comprises excluding from the first motion mask a pixel by determining whether a difference between a maximum pixel value and a minimum pixel value from among pixel values of neighboring pixels of the pixel exceeds a preset critical value.

14. The method of claim 12, wherein a local feature of a pixel in the current image frame indicates a pixel value relationship between two pixels among the pixel and neighboring pixels of the pixel, and wherein the detecting the first motion mask comprises detecting a pixel as the first motion mask by determining whether a number of local features of the pixel, which are the same as local features of a corresponding pixel in the previous frame, is equal to or less than a preset critical value.

15. The method of claim 12, wherein the detecting the second motion mask comprises detecting a pixel as the second motion mask by determining a difference between the pixel in the current image frame and a corresponding pixel in the previous image frame is equal to or greater than a preset critical value.

16. The method of claim 12, wherein the generating the final motion mask comprises generating, as the final motion mask, a common area in the current image frame between the first motion mask and the second motion mask or an area comprising both the first motion mask and the second motion mask.

17. The method of claim 12, wherein the at least one current image frame comprises a plurality of current image frames captured by using different exposures, the at least one first motion mask comprises a plurality of first motion masks, and the at least one second motion mask comprises a plurality of second motion masks, and wherein the generating the final motion mask comprises generating at least one third motion mask of the plurality of current image frames based on the first motion masks and the second motion masks, and generating the final motion mask based on the at least one third motion mask.

18. The method of claim 12, wherein the plurality of current image frames comprise a first current image frame captured at a first exposure level and a second current image frame captured at a second exposure level, and wherein the generating the final motion mask comprises generating the final motion mask comprising at least one of the third motion mask of the first current image frame and the third motion mask of the second current image frame.

19. The method of claim 18, wherein the generating the at least one third motion mask comprises:

generating the third motion mask of the first current image frame based on at least one of the first and second motion masks of the first current image frame; and generating the third motion mask of the second current image frame based on the first and second motion masks of the second current image frame.

20. The method of claim 12, wherein the at least one current image frame comprises first and second of current image frames captured using first and second exposure, respectively, wherein the at least one first motion mask comprises a first motion mask of the first current image frame and a first motion mask of the second current image frame, and wherein the at least one second motion mask comprises a second motion mask of the first current image frame and a second motion mask of the second current image frame.

\* \* \* \* \*